Patented Oct. 18, 1949

2,484,938

UNITED STATES PATENT OFFICE 2,484,938

PRESSURE-SENSITIVE ADHESIVE TAPE

Clarence Joseph Ebel, West St. Paul, and Richard Gurley Drew, St. Paul, Minn., assignors to Minnesota Mining & Manufacturing Company, St. Paul, Minn., a corporation of Delaware No Drawing. Application October 4, 1943, Serial No. 504,906

3 Claims. (Cl. 260—19)

This invention relates to pressure-sensitive adhesive sheets and tapes, wherein the adhesive mass is stably tacky, pressure-sensitive, and eucohesive. By "eucohesive" it is meant that the adhesive is more cohesive than adhesive, such that adhesive tape can be made therefrom which may be unwound from rolls, and stripped from surfaces (such as glass and metal) to which temporarily applied, without offsetting of adhesive.

An object of the invention is to provide oil-base pressure-sensitive adhesives, suitable for use in adhesive tapes, which are made from drying or semi-drying varnish oils and do not include natural rubber. A further object is to provide backings for adhesive tapes, which employ a product of such oils in combination with a fibrous backing sheet material (such as cloth or paper), or which employ a self-sustaining sheet or film of the oil product as the backing.

The production of sticky or tacky masses by the bodying of unsaturated fatty oils, as in the heat bodying of linseed oil to form "stand oil," or the oxidation of linseed and other oils to form "linoleum cement," has long been practiced. Reactive resins, such as oil-soluble heat-reactive phenol-formaldehyde resins, have been added to unsaturated fatty oils to improve film strength, waterproofness, etc., as in the manufacture of varnishes. The oils have been reacted with sulfur or sulfur compounds, as in the production of "factice," to produce insolubility and elasticity. Various derivatives of rosin, or rosin itself, are added to varnishes to obtain improved adherence to the surface to be protected. In all of these cases, the product either is non-tacky originally, or it promptly dries or hardens to a non-tacky condition on exposure to the air even at ordinary temperatures; and in this respect it is unstable. It was therefore an unexpected result to discover that mixtures of these unsaturated fatty oils, resins, and other agents could be so compounded and reacted as to produce eucohesive pressure-sensitive adhesives which could be used satisfactorily in the manufacture of pressure-sensitive adhesive sheets and tapes, and which under normal conditions of storage and use would maintain their properties of tackiness and internal strength for prolonged periods of time.

Polymerization or bodying of oils is ordinarily carried out in the varnish kettle, with only mild agitation, and to a point short of complete reaction, to yield a soft, weak, rather oily, and probably non-homogeneous gel or viscous liquid. Such a gel is satisfactory for use in inks or varnishes, but will not make a useful pressure-sensitive adhesive since it will still dry by oxidation to a non-tacky stage, and also since it is too soft to be eucohesive. Attempts to polymerize further in the usual equipment consisting of direct-fired open varnish kettles frequently result in charring or scorching of the polymerized oil. Oxidation alone converts the oil to a hard, non-tacky, and even crumbly product. Reaction with sulfur, or with various reactive resins, diminishes the oiliness or greasiness and tends to dry up the mass.

We believe that the unique results of our process are due to the proper balancing of polymerization, oxidation, and a procedure for stabilizing and strengthening the product, and to the use of a mixing process whereby the various reactions may safely be carried well past the usual safe limits. However, we do not wish to be limited to any specific theory in the characterizing of our invention.

In practicing our invention we may use any of the common drying or semi-drying ("reactive") varnish oils, such as dehydrated castor oil. The oil is first heat-bodied to a rather high viscosity, and is then mixed and heated in a heavy duty internal mixer with a compatible tackifier, such as zinc resinate, and a stabilizing and strengthening agent, preferably in the presence of an activator, such as a zinc activator. The zinc resinate acts as such an activator in addition to serving as a tackifier resin. If a non-activating tackifier is used, zinc oxide may be used (for example) as the activator. An activator should not be used which is of a kind, or in an amount, which unbalances or over-advances the reaction so as to prevent obtaining the desired type of adhesive product. Thus, for example, so-called fast "varnish-driers," illustrated by cobalt and manganese compounds (which function as powerful oxidation catalysts), and which can be classed as activators in the varnish art, tend to promote excessive oxidation such that a stably tacky adhesive product does not result, and hence are not desirable activators for the purpose of making such adhesives in accordance with the present invention. The stabilizing and strengthening agent may be a sulfur vulcanizing agent, such as sulfur or a thiuram polysulfide; or it may be an oil-soluble heat-reactive resin such as an oil-soluble heat-reactive phenol-aldehyde, or urea-aldehyde, or melamine-aldehyde resin; or it may be a combination of two or more of these or similar materials; which act to firm up the bodied oil, increase its internal or cohesive strength, and stabilize the mixture against the action of air and sunlight so that a stably tacky adhesive can be obtained.

During mixing and heating in the internal mixer, the mass progresses from a liquid to a gel, then to a crumbly stage. Upon reaching the desired end point, which may be defined as that at which a product is obtained which is stably tacky and more cohesive than adhesive (eucohesive) at room temperature, and which is preferably non-smudging (i. e. the mass no longer leaves a smear on a clean glass plate when pressed thereon and then lifted away), the mass is cooled. During cooling, the crumbly material clings together under the action of the mixer to form a tough, firm, tacky mass which of itself is an effective eucohesive pressure-sensitive adhesive. It may be taken from the mixer in this form and applied to any suitable backing member as by skim-coating or frictioning, according to methods well known in the art, to produce a useful pressure-sensitive adhesive tape; or it may be dissolved or dispersed in a suitable vehicle such as toluol, the dispersion coated on a backing, and the vehicle removed by evaporation.

Specific forms of our invention are illustrated by the following examples, in which all parts are by weight, without intent to be limited thereto.

EXAMPLE 1

A. *Preparation of bodied oil*

800 lbs. of dehydrated castor oil ("Castung No. 103," produced by the Baker Oil Co.) were heated in a direct-fired open varnish kettle to 600° F., and held at or slightly below that temperature, with occasional gentle stirring, until the viscosity of the oil reached a value of 900–1000 centipoises measured at 302° F. At this point the oil was transferred to small containers each of which held not more than 50 lbs., and was cooled rapidly to room temperature. The product was a heavy, sticky gel. The use of a vacuum type varnish kettle would produce a product of a somewhat lighter color and would remove more of the unreacted constituents, and hence would be preferable when available.

B. *Reaction in internal mixer*

| | Pounds |
|---|---|
| Bodied oil produced under part "A" | 300 |
| Zitro resin (tackifier resin) (a solid zinc resinate containing 4.8% combined zinc, from Newport Industries, Inc.) | 75 |
| Sulfur (powdered) | 9 |
| Bakelite No. 3360 (an oil-soluble, heat-reactive, phenolaldehyde resin from Bakelite Corp'n.) | 30 |
| Solid carbon dioxide ("dry ice") | 100 |

The bodied oil, Zitro resin, sulfur, and Bakelite No. 3360, were added in the order given, and at about 5–10 minute intervals, to an internal mixer (such as a No. 15 Baker Perkins "Mogul" mixer having a rated capacity of 150 gallons) which had previously been heated with steam at 80 lbs. pressure in the jacket. The materials first mixed together to form a rather viscous liquid containing lumps of unmelted Zitro resin, and at a temperature of 275° F. On continued heating and mixing, and with the mixer open to the air, the mass advanced progressively to a heavy gel stage and finally to a crumbly stage. During the latter part of the operation, fumes were continuously evolved. The steam was turned off as soon as the entire batch became crumbly; at that point the batch temperature was 300° F. With the mixer still in operation, the material was then tested at 5-minute intervals for "smudging", by rolling and pressing a 25–50 gram lump of the crumbly mass on a clean glass panel. As soon as a point was reached at which no oiliness nor smudginess was produced on the glass, cold water was turned on in the jacket of the mixer, and the Dry Ice, crushed to small chunks, was added to the batch. The time required from start of heating of the reactants to start of cooling of the product was approximately three hours. Cooling was continued for one hour, during which time the batch became cool enough to handle, and the crumbly discrete particles clung together to form large lumps. The product was tough and strong, tacky, and of a light brown color.

The same formula but with the sulfur omitted was lighter in color and essentially equivalent in tackiness but somewhat softer; but a somewhat longer heating cycle was needed to reach the non-smudging stage.

C. *Calender coating*

The adhesive product from part B was first milled on steel rolls. It was then skim-coated to both sides of a broadcloth backing, using a three-drum calender with the top roll hot, center roll warm, and bottom roll cold, according to standard methods as used in the rubber industry. After the second coat was applied, the resulting double-coated pressure-sensitive adhesive tape was wound up in roll form, using a Holland-cloth liner to separate the layers.

Various treated paper and cloth backings were also coated with this adhesive by calendering. The treatments given the backings were designed to fill and strengthen the backing, and also to prevent the adhesive from adhering too tightly to the reverse side. Hard waxes, such as carnauba wax, applied either from solution in an organic solvent, or from an aqueous dispersion, were effective agents for preventing such adhesion. Tapes so made, with the adhesive coated on the unwaxed side, could be wound up on their own backings in roll form without the necessity of using a liner to permit of subsequent unwinding of the roll. Such wax does not harm the present type of adhesive when in long contact therewith in tape rolls.

An effective type of treatment for paper backings is the glue-glycerine-formaldehyde treatment described in the R. G. Drew U. S. Patent No. 1,760,820. A suitable backing paper for masking tapes is a creped kraft towelling paper. Pressure-sensitive adhesive tape consisting of such treated backing, lightly back-sized with a hard wax, and skim-coated with approximately 2½ ounces per square yard of the adhesive as prepared under part B, showed a stripping-force adhesion value to a polished steel surface of 20 ounces per inch of width, when stripped back at a rate of 7.5 feet per minute, and could be removed from the steel surface without leaving any visible residue thereon. Rolls of such tape were still adequately tacky, and useful, even after 12 to 18 months storage under room conditions. The exposed adhesive layer of a test strip retained its adhesiveness over considerable periods of time even when exposed to test conditions including elevated temperatures, ultraviolet radiation, and presence of oxygen. For example, in an oxygen bomb at 158° F. and pressure of 300 lbs. per square inch, the adhesion value was unchanged at 72 hours.

EXAMPLE 2

Coating from solution

The product as made under part B of Example 1 was reacted to the end point as determined by the smudge test, and was then allowed to mix hot for an additional 15 minutes before cooling. To the approximately 414 parts of cooled base in the Mogul mixer was then added 1242 parts of "Amsco-Solv A", (a 50% aromatic hydrocarbon petroleum solvent from American Mineral Spirits Co.,) and 31 parts of denatured ethyl alcohol; the alcohol serves as a viscosity reducing agent. The solvent was added slowly so as not to allow the accumulation of hard lumps of undissolved material.

The resulting solution (or dispersion) was coated on various suitable backings such as cloth, treated paper, non-fibrous films (such as those of regenerated cellulose, cellulose acetate, ethyl cellulose, etc.), etc., by means of a spreader bar, and the solvent removed by evaporation, to produce satisfactory pressure-sensitive adhesive tapes which adhered well to various surfaces and which left no visible deposit of adhesive on such surfaces when removed therefrom. Transparent adhesive tape can be made in this way. A tape consisting of a unified backing of creped towelling paper treated with glue-glycerine-formaldehyde, and sized with wax on the back, as described under part C of Example 1, coated from solution with the adhesive as above described, and tested for adhesion, gave a stripping-force value of 25 ounces per inch width, was stable to aging and was resistant to oxidation and ultraviolet light.

By the use of the methods described in the Waldo Kellgren U. S. Patent No. 2,206,899, the adhesive solution of the present invention may be used for saturating and double-coating a cloth or tissue paper (such as "Troya tissue" or "Dextilose"), or other porous and fibrous sheet, to produce a unified double-coated adhesive sheet. Such a sheet may be attached to a temporary liner to facilitate use. A double-coated tissue paper may be laminated to a non-fibrous film to form an integral pressure-sensitive tape having a non-fibrous film backing, the interposed layer of adhesive uniting the paper to the film and the paper reinforcing the adhesive and the tape. Similarly a thin woven cloth may be double coated with the adhesive and laminated to a non-fibrous film backing, to provide a very strong pressure-sensitive tape having a smooth non-fibrous back surface.

EXAMPLE 3

Aqueous dispersions

To the approximately 414 parts of base stock in the Mogul mixer, from the formula and procedure of part B of Example 1, 20 parts of wood rosin were added at the start of the cooling process. After cooling to approximately room temperature, 75 parts of powdered casein were added and allowed to mix in. 75 parts of 28% ammonium hydroxide in about 300 parts of water were then slowly added, in order to dissolve the casein, form a soap with the rosin, and thereby produce an oil-in-water type dispersion. A further 800 parts of water were then added for dilution of the dispersion to a usable viscosity.

Such a dispersion may be used in treating and unifying fibrous backings such as porous paper (by saturating the sheet and then drying), which may then be used as the backing for a pressure-sensitive adhesive tape. A waxy backsize may be applied to such a backing, and a coating of pressure-sensitive adhesive as described under part B of Example 1 may then be applied to the face side by one of the methods described previously.

The dispersion may also be used as a primer, to produce a better bond between a hydrophilic backing member (such as a film of regenerated cellulose) and a hydrophobic pressure-sensitive adhesive, than might otherwise be obtained.

Various reactive oils or mixture of oils may be utilized in preparing the bodied oil of part A of Example 1, which is also employed in Examples 2 and 3. Tung oil is highly reactive and the reaction may be difficult to control when approaching the desired viscosity unless forced cooling, or a lower reaction temperature, is used. Dehydrated castor oil is preferred, although linseed oil is also satisfactory. Raw soya bean oil, and other semi-drying oils, may be given a preliminary treatment, as by passing ozonized air through the oil, to cause them to body sufficiently when heated. The addition of not more than about 5% of maleic anhydride; or of a heat-reactive, air-drying "Carbic" anhydride alkyd resin (such as No. 14,590 Bakelite resin of the "C-9" class), or of a heat-advancing, oil-soluble phenol-aldehyde resin (such as No. 14,634 Bakelite), is also effective in promoting the bodying of these oils, and in fact, will improve the product obtained, and speed up the reaction, in the case of linseed oil as well. The "Carbic" anhydride alkyd resin contains the polyhydric alcohol reaction product of 3,6-endomethylene-delta-4-tetrahydrophthalic anhydride obtained by reacting cyclopentadiene with maleic anhydride. These are examples of kettle type varnish oil bodying agents. Air blowing may be used, as with certain fish oils, to promote bodying. Synthetic oils, such as the ethylene glycol polyester of dimerized fatty acids (such as "Norepol," as developed by the Northern Regional Laboratory of the U. S. Department of Agriculture at Peoria, Ill.) may also be used as the varnish oil base.

Where the term "bodied oil" is used in the specification and the appended claims, it is intended to include the high viscosity masses resulting from the heating of varnish oils, either alone, or treated with oxygen or ozone, or with the addition of small amounts of reactive materials which increase the bodying characteristics of the mass, substantially as indicated above.

As indicated in the case of tung oil, the temperature of bodying may be varied, particularly as a means of controlling the reaction. Such variations are well understood by those trained in the art of varnish manufacture.

The viscosity of the bodied oil may be varied to a considerable extent. An apparent viscosity of 900–1000 centipoises measured at 302° F. is preferred, since on cooling to room temperature the oil is as thick as can conveniently be handled, will liquify and therefore be compatible with the resins and other ingredients at 275–300° F. in the Mogul mixer, and yet will set up to the desired crumbly stage in the mixer within a relatively short time.

The viscosity of these mixtures may be measured by means of a Synchro-Lectric Viscosimeter, made by the Brookfield Engineering Laboratories of Sharon, Mass. The values listed represent the viscosity of a sample of the oil taken from the kettle, cooled rapidly to 302° F., and tested immediately. Due to further viscosity increase during the necessarily slower cooling of the main batch, the viscosity of the material when transferred to the Mogul is somewhat higher. The viscosity measurements are probably not representative of true viscous flow due to the gelatinous nature of the bodied oil, but by means of the device above named, apparent viscosity readings may be obtained which are effective in controlling the uniformity of the product.

We have used bodied oils of an apparent viscosity of as low as 500 and as high as 3000 centipoises.

Oils at the lower viscosities require increased time in the Mogul mixer and the products are increasingly difficult to take past the "smudgy" stage. On the other hand, more highly bodied oils may char or scorch during cooling, or may even be a permanent gel at 300° F., in which case they will not mix effectively with the other ingredients to give a uniform reaction and product. Heavy bodied oils may, however, be transferred directly to the Mogul mixer without intermediate cooling (and consequent additional bodying or charring during such cooling and while not being stirred), where the requisite equipment is available. Or, when sufficiently effective heating means are provided, the entire process may be carried out in the Mogul mixer.

It is possible to react the bodied oil with the stabilizing and strengthening agents without adding a tackifier, but the mass is then likely to crumble before it is sufficiently reacted, and is also likely to char. Tackifiers are therefore preferably added in the Mogul mixer, to hold the mass together until well reacted, to assist in reuniting the crumbly material during cooling, and to prevent charring. The entire quota of tackifier may be added in the Mogul, or, if desired, a portion may be added later either in solution or on the mill.

Both the amount and the kind of tackifier help to govern the tackiness and other properties of the finished adhesive. Zinc resinates such as "Zitro," and "Zirex" (a higher zinc content resinate) are preferred both because of their high melting points, which improve the heat resistance of the adhesive, and because of the zinc content which activates and speeds the reaction or cure. Ester gum, or rosin itself, may, however, be substituted in whole or in part. Other examples of suitable tackifier resins are coumarone-indene resins (such as R-29, a medium soft thermoplastic resin from the Neville Co.), "Piccolyte" (a pure hydrocarbon thermoplastic terpene resin having a zero acid number, sold by Pennsylvania Industrial Chemical Corp. of Clairton, Penn.), "Nevillite resin" (hydrogenated indene-coumarone resin sold by the Neville Co.). When an activating effect is desired when the mixture does not include an activating type of resin, an activator (such as zinc oxide) may be added.

Sulfur, thiuram polysulfides (which yield sulfur in the process), and oil-soluble heat-reactive phenol-aldehyde, urea-aldehyde, and melamine-aldehyde resins, all aid in achieving both stabilization (producing a stably tacky condition) and strengthening (producing a eucohesive condition) of the bodied oil-and-tackifier reaction product, to a degree necessary for use as an adhesive. However, these several agents do not necessarily all produce the same degree of stabilization or of strengthening, and may also differ in other respects. For example, sulfur reacts with the mixture of bodied oil and tackifier to form a relatively weak but stable adhesive, which is dark in color; a typical phenol-aldehyde resin may react more rapidly to form a considerably stronger, lighter colored adhesive; a urea-aldehyde resin may react to form a very pale, very tacky adhesive which may subsequently decrease in adhesion value. Thus the individual agents may be useful either for stabilizing or for strengthening the adhesive; or they may be useful for both functions but to a different degree; or they may be capable of serving both functions to a satisfactory degree. The "stabilizing and strengthening agent" of the specification and claims accordingly is considered to include either a single polyfunctional material, or combinations of polyfunctional or monofunctional materials, which will give satisfactory stability and strength to the bodied oil-and-tackifier reaction product.

The extent of stabilization and strengthening must be so regulated as to produce the desired balance between tackiness and firmness. Increasing the proportion of stabilizing and strengthening agent reduces the tack, and at the same time makes the product less soluble and compatible, so that merely increasing the proportion of tackifier will not be sufficient to produce a satisfactry adhesive. Too low a proportion of stabilizing and strengthening agent, on the other hand, will result in an incompletely reacted mass which lacks the desired eucohesive property.

Modifiers such as pigments, fillers, dyes, etc. may be added to the compositions of this invention. Where the modifier is inert, it is preferred to add it tot he Mogul either before or during the reaction therein, in order to obtain maximum dispersion. However, such addition may be made later, as on the mill rolls used in part C of Example 1.

Although the adhesives of this invention are stable under conditions of normal storage and use, they are still reactive at elevated temperatures as demonstrated by the further vulcanization carried out under Example 9, described hereafter. It is therefore necessary to stop the reaction in the Mogul mixer when the correct stage has been reached. This may be accomplished, as shown, by rapid cooling to below the reactive temperature, both by running cold water through the jacket of the mixer, and by adding Dry Ice to the batch. In addition to the cooling effect of the Dry Ice, the carbon dioxide gas liberated by it displaces the air in the mixer and minimizes oxidation of the mass. Other methods of rapidly stopping the reaction include milling the adhesive on cold rolls, or dumping the batch into water and later drying at a safe temperature.

The end point of the reaction is subject to variation depending on the subsequent use of the product. Where a skim-coated (calendered) adhesive is desired which will not smudge, the reaction is preferably stopped as soon as a negative smudge test is obtained. Where the adhesive is to be applied from solution to form a non-smudging adhesive coating, it is found that the reaction should be advanced somewhat further. The apparent softening of the adhesive when dissolved may be due to a separation of its constituent parts on evaporation of the solvent, with the more soluble, and probably softer, portions concentrating at the exposed surface.

Separation and removal of soft, oily, and therefore smudge-promoting constituents may in fact be desirably accomplished by subjecting the adhesive mass to a washing or extraction process with a selective solvent such as alcohol, which dissolves out the oily material but not the eucohesive and tacky mixture of stabilized oil and tackifier. The washed adhesive is then dried, and coated on a suitable backing by methods previously described. Such an adhesive is lighter in color than an unwashed adhesive.

For some uses a slight smudging may not be objectionable. For example, the common friction tape made with rubber base adhesive will frequently leave a stain or smudge when stripped from a glass or metal surface; and such deposit has been considered by users to be unimportant due to the manner in which such tape is used. The adhesives of our invention may accordingly be utilized in a soft, slightly smudgy stage when employed in the manufacture of similar types of tape. Our adhesives may also be used in the form of a solution or dispersion in a volatile liquid vehicle, for example as a cement for attaching fabric to metal or for similar purposes, where the dried residue must be flexible and strong, but where a slight smudginess does not detract from the usefulness of the product. In such cases, the smudge end point is not necessarily used in determining the length of time of treatment in the Mogul mixer. Instead, a plastograph reading may be obtained, using the "Plastograph" as sold by the Brabender Corporation, Rochelle Park, N. J. Using the small sized mixer with S-shaped blades, operated at 60 R. P. M., with the lever arms in the intermediary position and with an additional 300 gram weight suspended from the auxiliary lever arm, and with the mixer jacket, and therefore the sample, at 212° F., a reading of between 900 and 1000 units is a satisfactory end point for adhesives to be used as above described.

While the formulas as heretofore given under Examples 1–3 are preferred for most uses, many other combinations of the same and other ingredients may also be used. The following additional examples, in which all parts are by weight, are illustrative of such variations.

EXAMPLE 4

| | |
|---|---:|
| Dehydrated castor oil (heat bodied to 1000 cps. at 302° F.) | 300 |
| Zitro resin | 30 |
| Uformite F 200 E (a 50% solution in xylol and butanol of a hydrocarbon-soluble heat-reactive alcohol-urea-formaldehyde synthetic resin, from Resinous Products & Chemicals Corp., Philadelphia, Pa.) | 40 |

This formula produces a very light colored adhesive product having low adhesion value; the adhesiveness may be somewhat increased by moderate increase in the percentage of Zitro resin.

EXAMPLE 5

| | |
|---|---:|
| Dehydrated castor oil (heat bodied to 1000 cps. at 302° F.) | 300 |
| Zitro resin | 70 |
| Bakelite resin No. 14,634 (an oil-soluble heat-reactive phenolaldehyde synthetic resin from the Bakelite Corp.) | 30 |

The product of this formula is slightly darker in color than that of Example 4. It has excellent adhesion to most surfaces, and is strong and eucohesive.

EXAMPLE 6

| | |
|---|---:|
| Bodied linseed oil (consists of a mixture of 700 parts linseed oil and 56¼ parts Bakelite resin No. 14,590, a resin presumably produced by the inter-reaction of an adduct of cyclopentadiene and maleic anhydride with glycerol and linoleic acid, heat bodied to a viscosity of 600 cps. at 302° F.) | 300 |
| Zitro resin | 60 |
| Sulfur | 3 |
| Bakelite resin No. 14,634 | 30 |

This adhesive is somewhat darker in color than that of Example 5, and the smudge end point is obtained in somewhat less time than in that example.

EXAMPLE 7

| | |
|---|---:|
| Bodied dehydrated castor oil (heat bodied to 1000 cps. at 302° F.) | 300 |
| Zitro resin | 140 |
| Sulfur | 9 |
| Tetrone "A" (dipentamethylene thiuram titrasulfide) | 3 |

This formula reacts rapidly to a plastograph reading of 900–1000 and is then cooled as described under Example 1, part B. The product is slightly smudgy, dark in color, and has a strong factice-like odor. It is particularly useful as a base material in providing an adhesive coating for friction tape.

EXAMPLE 8

In producing a useful friction tape, the product of Example 7 is further compounded as described below, and friction coated on a cloth base by means of a three-drum calender.

| | |
|---|---:|
| Product of Example 7 | 62.7 |
| Whiting | 17.9 |
| Carbon black | 2.0 |
| Pale gum rosin | 8.7 |
| R-29 coumarone resin (a medium soft permanently thermoplastic type coumarone-indene resin, solid at room temperature, maximum ash content 1%) | 8.0 |
| Beta naphthol | 0.7 |

Combine the ingredients by milling on a rubber mill at a roll temperature of 150–160° F., scrape from the roll, and allow to stand at room temperature for 24 hours. With the calender rolls at 180, 160 and 120° F. for top, center, and bottom rolls, respectively, friction the adhesive to one side of a cotton cloth web having a thread count of 48 x 48 per square inch, and weighing one pound per 5 square yards, to a coating weight of 0.30 to 0.35 pound of adhesive per square yard. Wind up in a roll, and let stand at room temperature for 24 hours. With the calender rolls at 200, 180, and 160° F., respectively, friction a further quantity of the adhesive to the opposite uncoated side of the cloth, to a total coating weight of 0.45 to 0.50 pound of adhesive per square yard. Wind up in a roll, using a liner of uncoated sheeting of the same specifications. From this roll, the tape may later be unwound, the liner removed, and the tape slit into narrower widths and wound up in small rolls. The tape, though tacky on both surfaces, requires no liner when in final roll form.

Small amounts of sulfur or thiuram polysulfides act as stabilizers and strengtheners for these compositions in the production of pressure-sensitive adhesives as heretofore shown. A further reaction may be carried out at elevated temperatures and with further amounts of these same materials to produce physical changes similar to those commonly associated with the vulcanization of rubber, such for example as increased resistance to solvents, increased tensile or internal strength, increased resilience, decreased temperature susceptibility, and loss of tack.

These vulcanizing agents, and any other desirable compounding ingredients such as accelerators, pigments, extenders, softeners, etc., may be added to the base material produced as in part B of Example 1, and the resulting vulcanizable composition may be used for various purposes including the manufacture of backings for pressure-sensitive adhesive tape, as here disclosed.

EXAMPLE 9

| | Parts by weight |
|---|---|
| Product from Example 1, Part B | 80 |
| Carbon black | 20 |
| Dixie clay | 20 |
| Stearic acid | 4 |
| Sulfur | 2.4 |

Combine the ingredients by milling on a rubber mill. After being milled until uniform, the mixture is skim-coated by calendering to one side of a cloth backing. This coating is then preferably, but not necessarily, surface sized with a thin film of a heat-reactive phenol-aldehyde resin applied from solution; the solvent is removed by evaporation, and the backing is suspended in an oven and heated for 8 hours at 180° F. The phenol-aldehyde resin may be made of 900 parts phenol and 854 parts formalin, heated with hydrochloric acid catalyst to a medium viscosity, neutralized with barium hydroxide, dehydrated, and heated with sodium hydroxide catalyst to a still higher viscosity, the reaction being abruptly stopped and the resin put into solution by the addition of a quantity of ethylene glycol monoethyl ether.

The treated backing produced by this procedure is preferably calender coated with the pressure-sensitive adhesive, on the side opposite the phenol-aldehyde resin, as in part C of Example 1, to produce a pressure-sensitive adhesive tape having improved resistance to the transference of water or moisture vapor. The same backing may also be utilized in conjunction with other types of pressure-sensitive adhesives.

If desired, the cloth support may be eliminated and the milled base sheeted out on the calender, for example, to a thickness of 0.10 inch, and vulcanized, as between heated platens in a press, for example for 3 minutes at 250° F., or wound up in roll form on a Holland cloth liner and heated in an oven for about 8 hours at 200° F. in the case of a roll of approximately one foot thickness. One surface may then be sized with a thin film of wax, and the other surface coated with the adhesive solution of Example 2 to produce a finished sheet useful for protecting various surfaces from the abrading action of a sand blast, and which may be used as a sandblast stencil. The sheet can be slit and wound in rolls to provide adhesive tape useful for various purposes, such as an electrical tape.

The product of Example 7 may also be used as a base for later vulcanization to non-tacky, flexible, rubbery sheets such as sandblast stencil backings, floorings, and gasket material. Substitution of the bodied linseed oil of Example 6 for the bodied dehydrated castor oil of Example 7 produces a still more desirable base for the production of vulcanized articles.

EXAMPLE 10

| | |
|---|---|
| Bodied dehydrated castor oil (heat bodied to 1000 cps. at 302° F.) | 300 |
| Bakelite resin No. 14,634 | 30 |
| Zinc oxide | 5 |

This formula when reacted to the smudge end point and coated on a treated paper backing as previously described is low in adhesion, but is sufficiently tacky for some purposes, such as for use as a protective wrapper or covering tape. In this case, the Bakelite resin acts as a mild tackifier as well as a stabilizing and strengthening agent.

EXAMPLE 11

| | |
|---|---|
| Bodied dehydrated castor oil (heat bodied to 1000 cps. at 302° F.) | 300 |
| Pale wood rosin | 60 |
| Light calcined magnesium oxide | 5 |
| Bakelite resin No. 14,634 | 30 |

This formula was compounded as described in Example 1 and reacted somewhat more slowly than the formula of Example 5, and the resin was lower in internal strength. When cooled, the adhesive mass was not entirely free of smudging; but when calender coated to a treated paper backing, as previously described, it produced a useful eucohesive adhesive coating which exhibited little if any smudging effect. This example illustrates the use of a magnesium activator in place of the zinc activators of the prior examples.

EXAMPLE 12

| | |
|---|---|
| Bodied dehydrated castor oil (heat bodied to 1000 cps. at 302° F.) | 300 |
| "Maroc" limed rosin (a limed rosin containing the equivalent of 5–6% Ca(OH)$_2$, obtained from Newport Industries, Inc.) | 60 |
| Bakelite resin No. 14,634 | 30 |

This example illustrates the use of a calcium activator.

What we claim is as follows, including such range of equivalents as the nature of the invention and the prior art permits:

1. A pressure-sensitive adhesive tape characterized by having a coating of a stably tacky eucohesive varnish-oil-base rubberless pressure-sensitive adhesive reaction product formed by subjecting to internal mixing and heating, a bodied dehydrated castor oil, a lesser proportion of zinc resinate tackifier resin, and a sufficient amount of oil-soluble heat-reactive phenol-aldehyde resin and sulfur vulcanizing agent to provide for reaction with the mixture of oil and resin to a crumbly and non-smudging stage but not far beyond such stage, to a temperature of the order of 300° F. and until a crumbly and non-smudging stage is reached at which the adhesive product is stably tacky and more cohesive than adhesive at room temperature.

2. A stably tacky eucohesive varnish-oil-base pressure-sensitive adhesive reaction product formed by subjecting to internal mixing and heating, a bodied dehydrated castor oil, a lesser proportion of zinc resinate tackifier resin, and still smaller proportions, sufficient to provide for reaction with the mixture of oil and resin to a crumbly and non-smudging stage but not far beyond such stage, of oil-soluble heat-reactive phenol-aldehyde resin and sulfur vulcanizing agent, to a temperature of the order of 300° F. and until a crumbly and non-smudging stage is reached at which the adhesive product is stably tacky and more cohesive than adhesive at room temperature, and then rapidly cooling and further mixing to a uniform tacky mass.

3. A pressure-sensitive adhesive tape characterized by having a coating of a stably tacky eucohesive varnish-oil-base rubberless pressure-sensitive adhesive reaction product formed by subjecting to internal mixing and heating a bodied varnish oil, a lesser proportion of a compatible zinc-resinate tackifier resin in amount not exceeding about one-half the weight of said oil, and a sufficient amount of a sulfur vulcanizing agent and an oil-soluble heat-reactive phenol-aldehyde resin to provide for reaction with the mixture of oil and resin to a crumbly and non-smudging stage but not far beyond such stage, the said mixing and heating being carried out at a temperature of the order of 300° F. and until a crumbly and non-smudging stage is reached at which the adhesive product is stably tacky and more cohesive than adhesive at room temperature.

CLARENCE JOSEPH EBEL.
RICHARD GURLEY DREW.

REFERENCES CITED

The following references are of record in the file of this patent:

UNITED STATES PATENTS

| Number | Name | Date |
|---|---|---|
| 2,077,299 | Abrams et al. | Apr. 13, 1937 |
| 2,133,886 | Beegle et al. | Oct. 18, 1938 |